(No Model.) 2 Sheets—Sheet 1.

H. S. HALE.
MANGER.

No. 490,767. Patented Jan. 31, 1893.

Witnesses:

Inventor:
Henry S. Hale
By his atty

THE NORRIS PETERS CO., PHOTO-LITHO., WASHINGTON, D. C.

(No Model.) 2 Sheets—Sheet 2.
H. S. HALE.
MANGER.
No. 490,767. Patented Jan. 31, 1893.
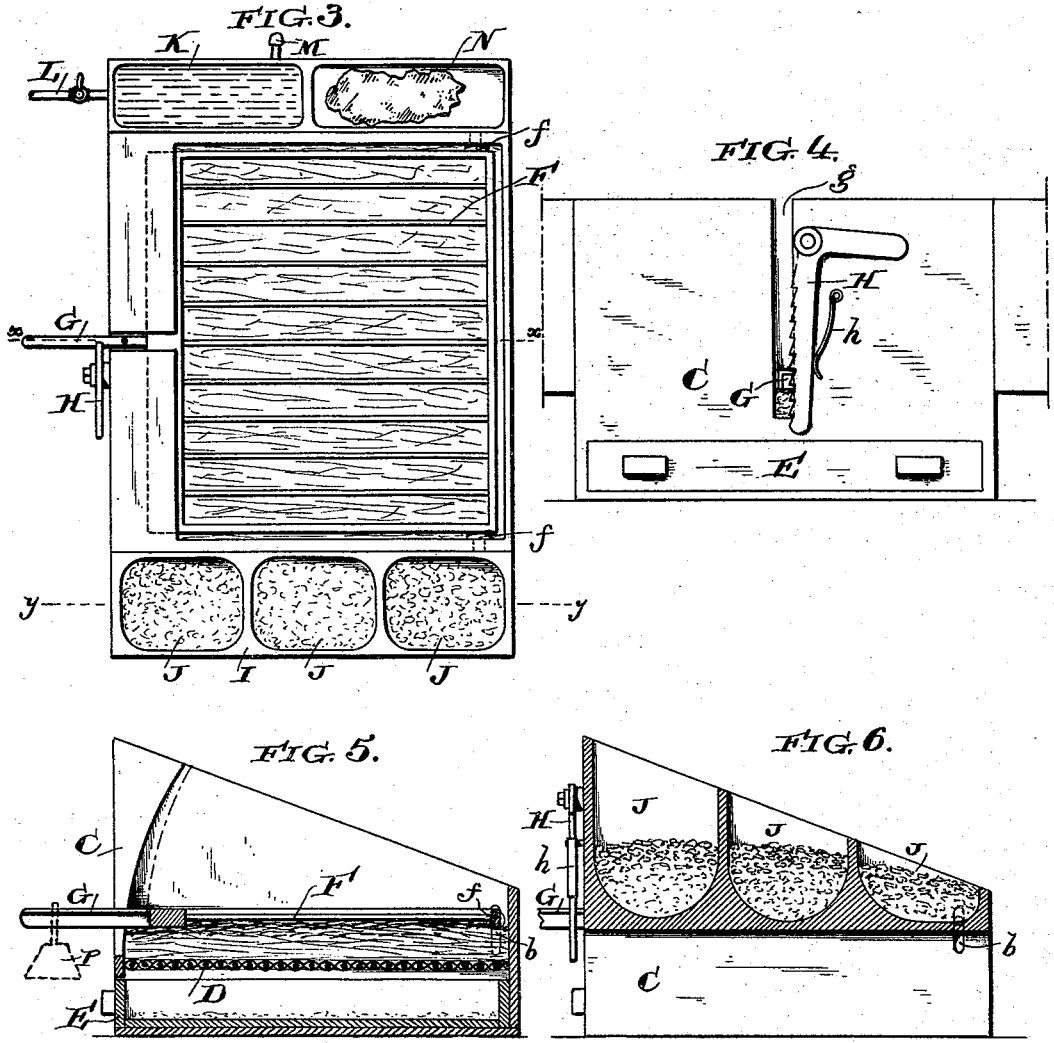
Witnesses:
Henry Dung
S. T. Yerkes.
Inventor:
Henry S. Hale
By his atty

UNITED STATES PATENT OFFICE.

HENRY S. HALE, OF PHILADELPHIA, PENNSYLVANIA.

MANGER.

SPECIFICATION forming part of Letters Patent No. 490,767, dated January 31, 1893.

Application filed August 19, 1891. Serial No. 403,087. (No model.)

*To all whom it may concern:*

Be it known that I, HENRY S. HALE, of the city and county of Philadelphia and State of Pennsylvania, have invented an Improvement in Mangers, of which the following is a specification.

My invention relates to mangers, and consists of certain improvements which are fully set forth in the following specification and are shown in the accompanying drawings which form a part thereof.

It is the object of my invention to provide a manger of improved construction for supplying fodder to a horse or other animal.

My improvements include certain novel features in the construction and arrangement of the portions of the manger for containing the hay, oats, water &c, whereby they may be conveniently supplied and easily reached by the animal.

It is my object also to so construct the manger that it will be kept clean and the mixing, scattering and wasting of the fodder by the animal will be prevented.

The novel features of construction and combination of parts which I employ in carrying out my invention are more fully set forth and claimed hereinafter.

Figure 1:
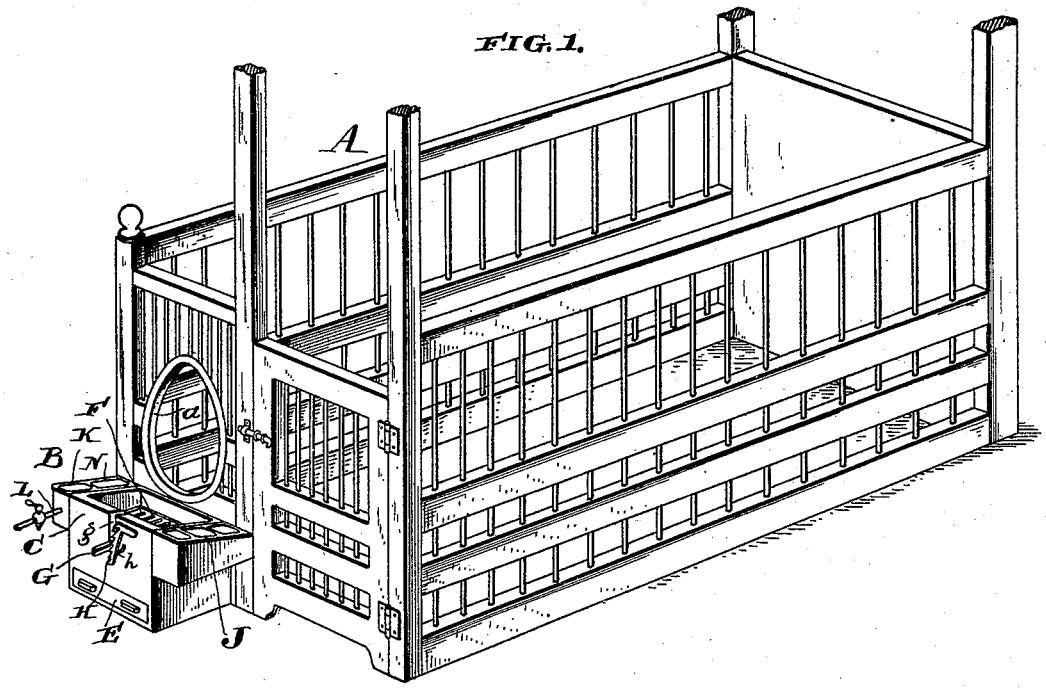
Figure 2:
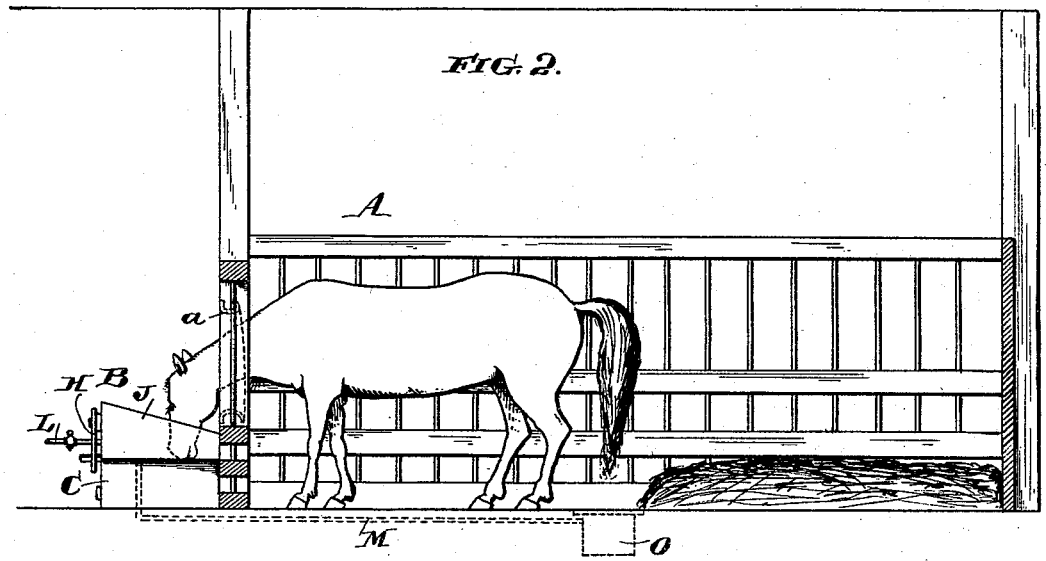

In the drawings:—Figure 1 is a perspective view of a box stall having my improved manger applied thereto; Fig. 2 is a sectional side elevation of the stall, showing a side elevation of the manger; Fig. 3 is a plan view of the manger on an enlarged scale; Fig. 4 is a front elevation of a portion of the same; Fig. 5 is a sectional view of the same on the line $x-x$ of Fig. 3; Fig. 6 is a similar view on the line $y-y$ of Fig. 3.

A is the stall, which may be of any desired construction and character.

B is the manger.

In the drawings I have shown a box stall A with the manger B arranged upon the outside, and an opening $a$ in the stall for the head of the animal; it is evident however that the manger may be arranged on the inside of the stall.

The manger B consists of the central box portion C with an opening to receive the hay and is provided with a supporting diaphragm D upon which the hay is adapted to rest. This diaphragm D is preferably constructed with openings or perforations, as of woven wire, to permit the dust and dirt from the hay to drop through into the lower part of the box portion C, in which there may be located a drawer or pan E.

F is a rack arranged above the diaphragm D, to hold the hay. The hay may be more or less compressed between the parts F and D so as to be held firmly, and while the animal may withdraw the hay between the bars of the rack, he is thus prevented from scattering it about the manger and stall. One of the parts F and D is made movable to permit the desired quantity of hay to be placed in the rack.

In the construction shown in Figs. 1 to 6, the rack F is provided upon the inner ends of its sides with pins $f$ which are received in slots $b$ in the sides of the box. In this manner the rack is pivotally connected with the box C at its inner end. The slots $b$ permit the inner end to move slightly.

G is an arm projecting from the other end of the rack F through a slot $g$ in the box C. By this arm G the rack may be lifted upon its pivots to permit the placing of the hay upon the diaphragm. The rack F presses upon the hay and of its own weight may be made to descend or fall as the hay is pulled out by the animal so that it is constantly pressing upon the hay and holding it upon the diaphragm. This pressure may be obtained by making the outer or free end of the rack heavy or by the use of a weight P as is shown in Fig. 5.

H is a toothed dog pressed by the spring $h$ into engagement with the arm G to lock the rack F against upward movement. The toothed dog permits the rack to be forced lower by the animal as the hay is withdrawn. The rack F is thus kept close upon the hay.

I is a feed box arranged upon one side of the box C to contain the oats &c. This box is preferably made with a series of cup shaped pockets J, each of a size large enough to admit the muzzle of the animal for the purpose of taking up the feed but not large enough to permit "nosing" it.

K is a water receptacle upon the other side of box C to which water is supplied by a valved pipe L.

M is an overflow pipe from the receptacle

K through which the water may be conducted to the gutter of the stall O (see Fig. 2). By this means the receptacle may be supplied with fresh running water and the overflow may be utilized for keeping the gutter of the stall clean.

N is a receptacle for rock salt arranged adjacent to the box C. It will thus be seen that the manger is adapted to contain all of the articles of food &c for the horse in a small space and in positions conveniently reached by the animal, while the peculiar construction of the parts prevents the mixing of the articles and keeps the manger and stall in a neat and clean condition.

While I prefer the minor details of construction which have been here shown I do not limit myself to them as they may be modified in many ways without departing from the invention.

What I claim as new and desire to secure by Letters Patent, is:—

1. In a manger, the combination of a frame provided with a support for hay or other material and having slots $b$ adjacent to and in front of the support, and a rack F having its ends provided with projections $f$ adapted to fit into said slots to form a pivoted connection for the rack F, said rack being free to move toward the support.

2. In a manger, the combination of a frame having a support for hay or other material, a grated rack F having one end pivoted adjacent to and above the support and the other end free, and a spring pressed dog engaging and locking the free end of the rack against movement away from the support but permitting movement toward it.

3. In a manger, the combination of a box frame having a stationary support for hay or other material, a grated rack pivoted at one end adjacent to and in front of the support and having its outer or free end provided with a projecting arm, a toothed dog pivoted to the box frame adjacent to the projecting arm of the rack, and a spring to press said toothed dog into engagement with the arm.

4. In a manger, the combination with a supporting diaphragm for hay or other material of a movable weighted rack arranged in front of said supporting diaphragm and moved toward it by the force of gravity, and a lock to positively hold said rack against movement away from the support, whereby the rack is kept pressed upon the hay on the supporting diaphragm.

5. In a manger, the combination with a support for hay, of a gravity actuated rack arranged above said support and movable toward it by the action of gravity, a lock to hold said rack against movement away from the support, and a spring normally acting upon said lock to hold it in action to positively prevent upward movement of the rack.

In testimony of which invention I have hereunto set my hand.

HENRY S. HALE.

Witnesses:
 JNO. S. HARKELS,
 EDWARD STEIN.